United States Patent
Wu et al.

(10) Patent No.: US 6,544,471 B1
(45) Date of Patent: Apr. 8, 2003

(54) METHOD AND APPARATUS FOR PRODUCING HIGH CHROMIUM CONTENT STEELS AND/OR FERROALLOYS IN AN ELECTRIC ARC CONVERTER

(75) Inventors: Wei-Ping Wu, Erkrath (DE); Karl-Heinz Deppner, Voerde (DE); Karl-Josef Schneider, Schermbeck (DE)

(73) Assignee: SMS Schloemann-Siemag Aktiengesellschaft, Düsseldorf (DE)

( * ) Notice: Subject to any disclaimer, the term of this patent is extended or adjusted under 35 U.S.C. 154(b) by 36 days.

(21) Appl. No.: 09/583,043

(22) Filed: May 30, 2000

Related U.S. Application Data

(62) Division of application No. 09/104,320, filed on Jun. 25, 1998, now Pat. No. 6,068,676.

(30) Foreign Application Priority Data

Jun. 30, 1997 (DE) .......................................... 197 28 102

(51) Int. Cl.⁷ ................................................. C21C 5/50
(52) U.S. Cl. ..................................... 266/247; 266/245
(58) Field of Search ............................... 266/245, 246, 266/247; 432/262; 75/10.42; 373/44, 45, 71, 72

(56) References Cited

U.S. PATENT DOCUMENTS 4,124,200 A * 11/1978 Antoine et al. ............. 266/245
6,068,676 A *  5/2000 Wu et al. .................. 75/10.42

* cited by examiner

*Primary Examiner*—Scott Kastler
(74) *Attorney, Agent, or Firm*—Friedrich Kueffner

(57) ABSTRACT

An apparatus for producing steels with predominantly high Cr content and/or ferro-alloys, wherein the metal charge is melted in a melting crucible, is alloyed, refined and reduced, and wherein process gases are simultaneously supplied through bottom nozzles. A melting crucible is used with a specific reaction volume of 0.4 to 1.5 $m^3$/t steel and the injection rates of the process gases are controlled in the range of 0.1 to 3.0 N $m^3$/t/min. The solid charge material is melted by an electric arc and air/nitrogen are injected simultaneously and, after forming a liquid sump, a gas mixture of oxygen and inert gas is injected. After adding slag-forming constituents and alloying agents, the oxygen throughput is increased and the power of the electric arc is reduced accordingly. The oxygen throughput is reduced in relation to the inert gas during refining and decarburization takes place as a result of increasing the electric arc with low chromium slag formation. During the reduction of the melt with suitable reduction agents, primarily chromium is reduced from the slag and silicon is bound by slag-forming constituents.

6 Claims, 6 Drawing Sheets

METHOD AND APPARATUS FOR PRODUCING HIGH CHROMIUM CONTENT STEELS AND/OR FERROALLOYS IN AN ELECTRIC ARC CONVERTER

CROSS-REFERENCE TO RELATED APPLICATIONS

This is a Divisional Application of U.S. patent application Ser. No. 09/104,320, now U.S. Pat No. 6,068,676, filed Jun. 25, 1998.

BACKGROUND OF THE INVENTION

1. Field of the Invention

The present invention relates a method and an apparatus for producing steels with predominantly high Cr content and/or ferro-alloys, wherein the metal charge is melted in a melting crucible, is alloyed, refined and reduced, and wherein process gases are simultaneously supplied through bottom nozzles.

2. Description of the Related Art

Various methods have already become known for manufacturing stain-resistant, acid-resistant and heat-resistant high-grade steels having a high degree of purity and low gas contents.

The best known method is melting in the arc furnace, or melting in the arc furnace with subsequent refining in a converter with the use of mixed gases or in a vacuum.

The manufacture of these stain-resistant, acid-resistant and heat-resistant high-grade steels only in the arc furnace is very complicated with respect to energy technology and is problematic with respect to the degree of purity to be adjusted.

The manufacture of the aforementioned steels in the arc furnace with subsequent refining in the previously known converters with the use of mixed gases has the disadvantage that these converters were originally designed for the exclusive manufacture of chromium steels which have a smaller specific reaction volume than is required for the manufacture of high-grade steel qualities with a wide spectrum of alloying contents. A requirement for the necessary high refining and heating speed is a large specific oxygen supply. In addition, during the deoxidation phase it is not possible to prevent a reoxidation of the melt by the air entering the reaction space. Moreover, an intensive air oxygen contact occurs during tapping of the reduced steel which results in harmful oxidic impurities and, thus, leads to waste in the product.

Generally used today for the above-described manufacture of high-alloy, high-grade steel, preferably with high Cr and Ni contents, are, as far as the plant concept is concerned, the so-called "duplex method", i.e., use of an electric arc furnace with a subsequent converter, as well as the so-called "triplex method", i.e., use of an arc furnace with subsequent converter and subsequent vacuum plant.

In both concepts of the plant, the arc furnace serves as a premelting unit. The actual refining process for manufacturing the desired steel quality with high alloy contents and low carbon contents takes place in a converter with lateral below-bath nozzles, in a converter with bottom nozzles, or in a converter with both nozzle arrangements, i.e., laterally and in the bottom.

Known in the art are the AOD-method (argon, oxygen, decarburization) and the improved AOD-(L) method (argon, oxygen, decarburization) (Lance) with a converter having a specific volume of 0.45–0.60 m$^3$/t steel.

The original method operates only with one or more bottom nozzles, while the improved method uses a lance for blowing in oxygen additionally from the top through the crucible opening. Also known is the CLU-(L) (Creusot Loire Uddeholm) method in which a portion of the inert gas is used for reducing the partial CO pressure by superheated steam.

In the C-OBM-S/C-BOP method (combined, oxygen, bottom, Maxhütte, stainless or combined, basic, oxygen process), bottom nozzles as well as side nozzles are used, wherein additionally hydrocarbons or inert gases or a mixture of both gases are used as cooling gas for protecting the nozzles.

In this method, two converters are used instead of an arc furnace and a converter, wherein pig iron dephosphorized in the so-called premelt converter is injected into a premelt and is subsequently filled into a premelt ladle and is then filled in the so-called refining converter where the refining process is carried out with a mixture of $O_2+N_2+(Ar)$ and a hydrocarbon-containing protective gas with the addition of scrap, alloying agents and additives. In both crucibles, oxygen is additionally injected into the converter through a top lance.

Finally, the CMS-S method (combined, Maxhütte, stainless steelmaking) should be mentioned in which, in addition to the process gases mentioned above, added to the converter crucible are coke or carbon additions in pulverized or finely particulate form for afterburning, while simultaneously increasing the portion of solid metal charge materials and for improving the metallurgical process sequence.

Consequently, in both plant concepts, a premelt crucible in the form of an electric arc furnace and a refining crucible in the form of a converter are used, wherein temperature and energy losses as well as discharge and metal losses cannot be avoided each time the treatment unit is changed and the premelt is filled into another unit.

In order especially to reduce the chromium losses, the premelt must be reduced with FeSi/Al prior to each change of the crucible. However, in this case, calculated excessive reduction agents are required for achieving a reduction which is as complete as possible. The excess introduced in this manner must be once again treated with oxygen in the subsequent unit, i.e., a converter, after being refilled, before the decarburization without significant chromium slagging and further treatment steps are carried out.

DE 33 47 718 discloses a method of producing high-grade steels, particularly steels with high chromium contents, which utilizes the "duplex method" already discussed above. In this method, for producing steels having a high degree of purity and low gas contents in steel mills and steel foundries, the steel, after melting in an electric arc furnace or similar melting unit, is filled with the desired alloying components into a converter, is refined and deoxidized, wherein simultaneously purging with an inert gas takes place and the melt, after tapping from the converter into the ladle, is fined by purging with inert gas.

A converter having a specific reaction volume of between 0.45 and 0.8 Nm$^3$/t steel is used and the process gas supply during the converter treatment is controlled within the range of 0.5 to 2.0 Nm$^3$/t·min.

The process gas supply takes place in the converter through blow or injection openings in the bottom or near the bottom, wherein the converter opening is temporarily made smaller during the deoxidation phase and a collected slag containing a deoxidizing substance is added to the steel during tapping.

DE 195 09 285 C1 discloses a melting crucible plant with one or also two converter crucibles arranged next to each other, wherein the melting crucible is attached through support elements arranged on the circumference to inner travel rings, and wherein each of the inner travel rings is mounted by means of roller segments in an outer travel ring which rolls on travel rails in a travel groove.

During the steel production, either an injection lance attached to a lifting and pivoting device or the electrodes attached to a pivotable electrode support are lowered into the converter crucible in order to refine liquid metal charge material or to melt solid metal charge material.

EP 0 630 977 A1 discloses a converter for producing steel from solid and/or liquid charge materials, such as pig iron and/or scrap and/or sponge iron, which includes a refining crucible with refractory lining, a refining unit supplying oxygen or an oxygen-containing gas, and a heating unit.

For producing the steel, the heating unit includes at least one consumable graphite electrode and the refining unit is formed independently of the heating unit either by an oxygen injection lance or has oxygen-injecting bottom nozzles and/or side nozzles located underneath the melt bath level.

The method includes as a first method step a principal refinement of pig iron and possible a partial quantity of scrap and/or sponge iron, and subsequently as a second method step melting of additionally introduced scrap and/or sponge iron and refining possibly simultaneously or as a third method step, wherein during the first method step only the refining unit is active and in further method steps the refining unit as well as at least as one graphite electrode are activated, wherein the activation is alternatingly in the case of injection of oxygen from the top and alternatingly or simultaneously in the case of injection of oxygen from below the melt bath level.

Neither the converter nor the method are suitable for producing stain-resistant, acid-resistant and heat-resistant qualities because, on the one hand, not available are the suitable devices for the injection of inert gases (Ar) with hydrocarbon-containing cooling gases and a suitable crucible concept and, on the other hand, specific method steps are not available for providing a solution for the stated object.

SUMMARY OF THE INVENTION

Therefore, it is the primary object of the present invention to provide a method and an apparatus for producing steel in which the temperature and energy losses as well as the discharge and metal losses, particularly the chromium losses, in the manufacture of high-grade steels, are further reduced, the plant costs and operating costs are lowered and the efficiency of the entire manufacture of high-alloy and highest-alloy, high-grade steels, particularly of stain-resistant, acid-resistant and heat-resistant qualities, is improved.

In accordance with the present invention, in a method of manufacturing steel of the above-described type, a melting crucible is used with a specific reaction volume of 0.4 to 1.5 $m^3/t$ steel and the injection rates of the process gases are controlled in the range of 0.1 to 3.0 N $m^3/t/min$. The solid charge material is melted by means of an electric arc and air/nitrogen are injected simultaneously and, after forming a liquid sump, a gas mixture of oxygen and inert gas is injected. After adding slag-forming constituents and alloying agents, the oxygen throughput is increased and the power of the electric arc is reduced accordingly. The oxygen throughput is reduced in relation to the inert gas during refining and decarburization takes place as a result of increasing the electric arc with low chromium slag formation. During the reduction of the melt with suitable reduction agents, primarily chromium is reduced from the slag and silicon is bound by slag-forming constituents.

Accordingly, in accordance with the present invention, a melting unit is provided which combines the properties of an electric arc furnace and of a converter, wherein, when using solid metal charge materials in the form of commercially available high-grade steel scrap and alloying agents, the energy for melting and manufacturing a premelt is provided by the electrical energy of the electric arc.

For further treating the already prealloyed melt, reaction gases, cooling gases and inert gases are supplied through nozzles arranged in the bottom of the converter or laterally above the bottom, wherein the specific injection rates are in the range of 0.1 to 3.0 $Nm^3/t$ steel.

Depending on the progress of the process, $O_2$, $CO_2$, $N_2$, Ar are used as process gases and $CH_2$, $N_2$, Ar, air are used as cooling gases.

The method of manufacturing high chromium content steels as well as ferroalloys in only one melting crucible with a reaction volume of 0.4 $m_3/t$–1.5 $m^3/t$ steel, preferably 0.45 $m^3/t$–0.75 $m^3/t$ steel, includes the following steps:

a) Charging

Scrap and portions of ferroalloys are charged through charging boxes into the melting crucible after the crucible has been turned to the charging side, wherein a rapid scrap charging is ensured after the hood has been swung away.

Liquid metals, i.e., either pig iron or liquid FeCr, can also be charged without difficulties. Moreover, pieces of ferroalloys/additives and DRI/HBI can be added continuously during the process.

b) Melting

Initially, a shorter electric arc with lower electric power is used until sufficient bulging exists in the solid metal charge material. Subsequently, the power is increased to the maximum melting power until the scrap or charge materials are melted.

Prior to melting, i.e., during charging, the bottom nozzles are only cooled with air. This is switched to nitrogen at the beginning of melting. If the air supply network offers an appropriate pressure, it is also possible to continue to purge with air. After forming a liquid sump, a gas mixture of oxygen and inert gas is additionally injected, wherein the throughput is increased with the progressing melting process. The nozzles are cooled with $CH_4$ and inert gas as shroud gas.

c) Alloying

Slag-forming constituents and ferroalloys are added toward the end of melting. When a sufficient electric energy quantity has been introduced, the oxygen throughput through the bottom nozzles is increased to the maximum throughput, and the electric arc power is reduced to a minimum.

d) Refining

The ratio of oxygen to inert gas in the gas mixture is reduced step by step in order to produce an inert gas atmosphere. This reduces the partial CO pressure in the crucible and decarbonization takes places without chromium slagging. Due to the high temperature at the bath level because of the influence of the electric arc, the decarburization with as little chromium slagging as possible is additionally facilitated.

Since the charging of chromium or liquid FeCr with a high Si content introduces a large quantity of $SiO_2$ into the slag, it is necessary to carry out an intermediate deslagging step before a further decarbonization can take place.

e) Sampling

When the necessary oxygen quantity for achieving a certain carbon content has been injected, the electrodes are moved up and swung away.

A temperature measurement is carried out and a melt sample and a slag sample are taken. When a further treatment is to be carried out in a vacuum plant, for example, a temperature of about 1650° C. and a carbon content of about 0.3% are desired. However, if the steel is to be completely treated in the melt crucible, the required final carbon content of about 0.02–0.25% and the required casting temperature of about 1670° C. are to be desired.

f) Reheating and Injecting

If a correction of the temperature and carbon content are necessary, the electrodes are swung back in. Electric heating is carried out and an inert gas-rich gas mixture is injected.

g) Reduction

After reaching the desired temperature and carbon content and alloy contents, the melt is reduced with FeSi and/or Al. This reduces metals, primarily chromium, from the slag. Lime is added in order to bind $SiO_2$ in the slag.

h) Deslagging

For deslagging, the melting crucible is turned to the tapping side or to the side opposite the charging side. If a tapping hole is present, tapping can be carried out in a slag-free manner through the tapping hole.

i) Desulphurization

If a deep desulphurization is required, lime and other desulphurization agents can be added to the melting crucible. An effective desulphurization can be achieved by means of the electric arc and by strong bottom purging.

j) Further Treatment

As already mentioned, the melt can be treated further in a vacuum plant in order to reduce the Ar consumption during the production of deeply decarburized steel qualities and steel qualities in which nitrogen has been removed.

The melting crucible for carrying out the method according to the present invention is equipped with bulging middle and bottom crucible parts rotatably supported in a support ring. The crucible further has an exchangeable bottom in which the bottom nozzles are arranged. The crucible may be covered by an upper part or crucible cover which can be swung away, wherein the crucible opening is kept as small as possible in order to prevent the penetration of secondary air into the crucible during the process.

The support ring is constructed semicircular and the crucible side opposite the support ring is constructed in the upper portion thereof as a vertical crucible wall.

Electrodes are introduced into the melting crucible through an opening in the upper part which can be swung away. The nozzles arranged in the bottom are constructed in the conventional manner as annular gap nozzles or casing nozzles. In addition, a tapping pipe connection can be arranged in the bulging middle part of the crucible.

The use of the melting crucible according to the present invention makes possible a number of savings in the plant concept as compared to the duplex method. For example, a single-nave building can be used, a ladle transporting vehicle which travels between two buildings is not necessary, and the required crane facilities, bunker facilities with metering and charging devices for alloying agents and additives, and dust-removal facilities can be reduced.

In addition, the requirement of operating media, such as cooling water as well as media for injection into the converter, particularly oxygen, can be partially reduced to a significant extent, the slag content can be reduced from about 180 kg/t to 130 kg/t and, thus, the consumption of lime and reducing agents can be lowered. Moreover, the electrical energy for melting can be reduced up to 100 kW/t steel and the electrode consumption can be lowered to 0.8 kg/t steel.

Parallel with the lowering consumption values mentioned above, the tap-to-tap period can be shortened as compared to the duplex method. As compared to the conventional tap-to-tap times of 65 min for a LBO-converter and 45 min for a AOD-converter or a ASM-converter, i.e., together 110 min, the present invention makes possible a reduced tap-to-tap period of about 72 min. In addition, the refractories consumption can be decisively lowered in the apparatus according to the present invention.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
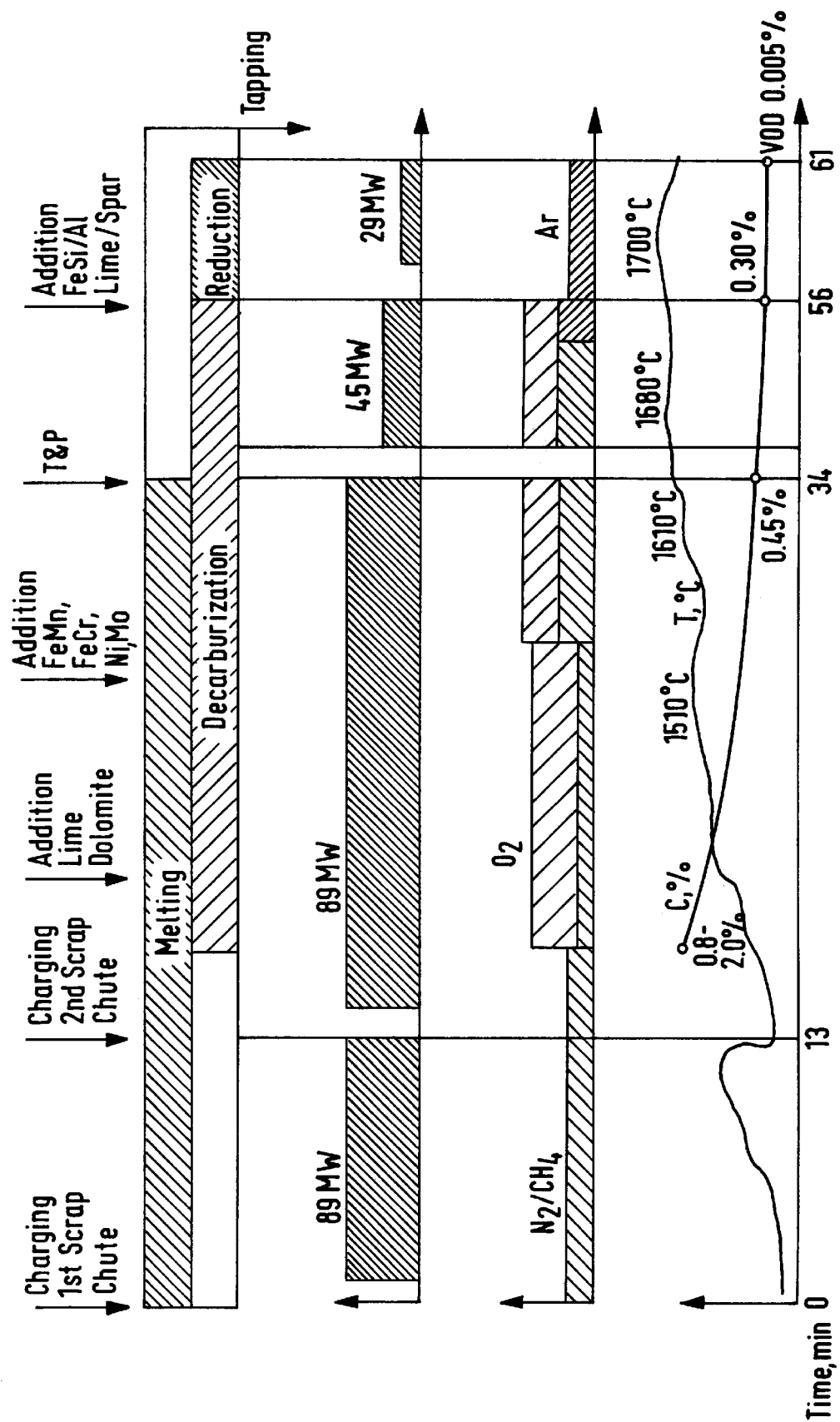
FIG. 1 is a diagram showing the treatment sequence of a 100 t melt up to a final carbon content of 0.3% with subsequent further treatment in a vacuum plant.

FIG. 1 of the drawing schematically shows the treatment sequence of a 100 t melt in the converter crucible according to the present invention, wherein feeding of the electrical energy takes place through a 95 MVA transformer.

In the time/distance diagram of FIG. 1, the individual method steps for producing a stain-resistant, acid-resistant and heat-resistant steel in dependence on the addition of metal solid charge materials, additives, alloying and reduction agents are shown as follows:

Melting, decarburization and reduction of chromium,

Electrical energy consumption by the electrodes in MW,

Addition of cooling and reacting gases, such as $N_2/CH_4$ and of $O_2$ and Ar, and Temperature pattern of the melt with illustration of the decarburization sequence.

The final carbon content of 0.3% is reached by calculation after 61.0 minutes. Thereafter, the melt is emptied into a casting ladle and is transported for further treatment in a vacuum plant. In the vacuum plant, a decarburization content of 0.005% is reached.

Figure 2:
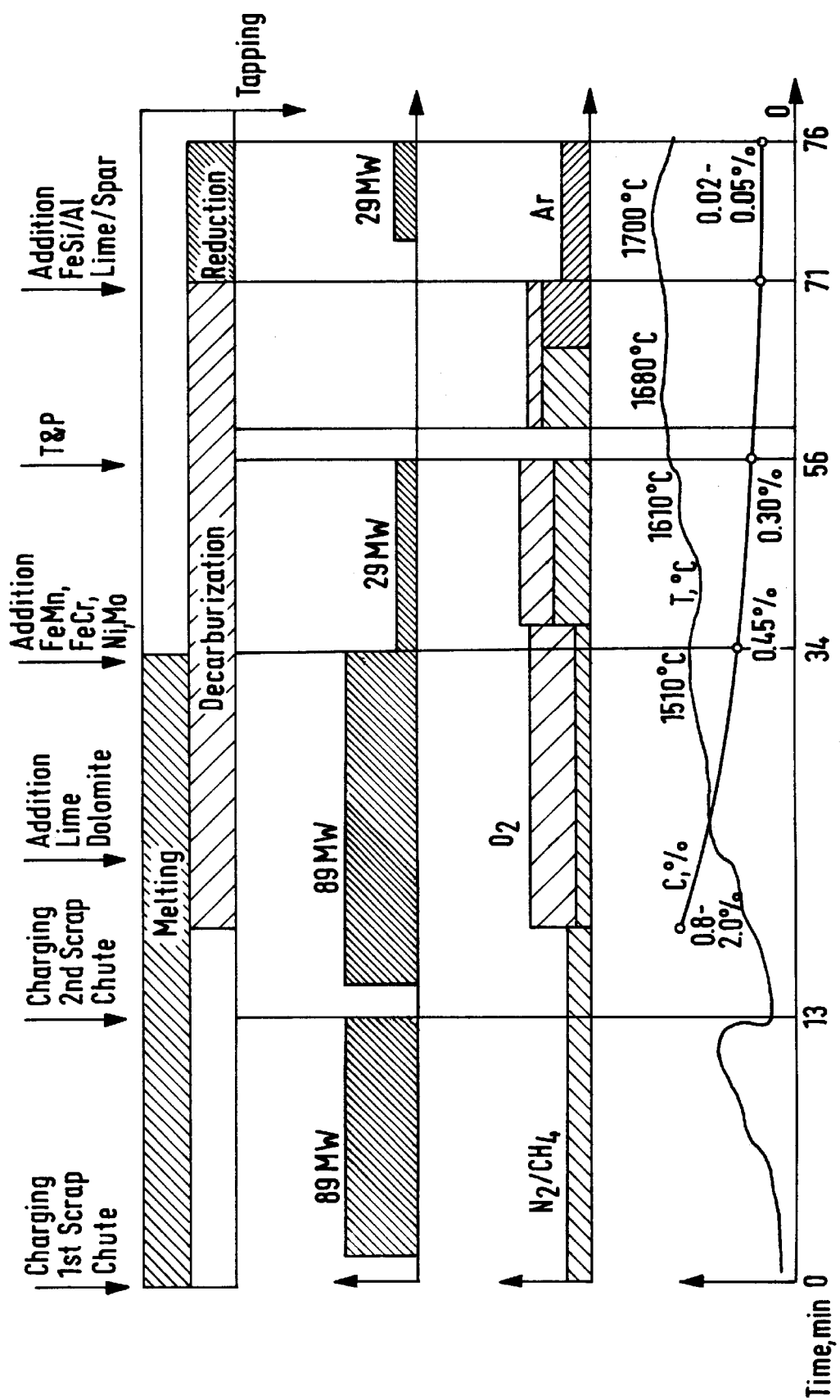
FIG. 2 is a diagram showing the treatment sequence of a 100 t melt up to a final carbon content of 0.02–0.05% without further treatment in a vacuum plant.

FIG. 2 of the drawing schematically shows the treatment sequence of a 100 t melt in the converter crucible according to the present invention in which feeding of the electrical energy takes place by means of a 95 MVA transformer.

A vacuum treatment of this melt is not intended because for this quality only a carbon content of 0.02–0.05% is to be desired.

In this time/distance diagram, the method steps for producing a stain-resistant, acid-resistant and heat-resistant steel in dependence on the addition of metal solid charge materials, alloying and reduction agents are shown as follows:

Melting, decarburization and reduction of chromium,
Electrical energy consumption by the electrodes in MW,
Addition of cooling and reacting gases, such as $N_2/CH_4$ and of $O_2$ and Ar, and
Temperature pattern of the melt with illustration of the decarburization sequence.

In this case, a carbon content of 0.3% is reached by calculation after 56.0 minutes. The desired C-content of 0.02–0.05% is reached by a further treatment time of about 20 minutes.

Figure 3:
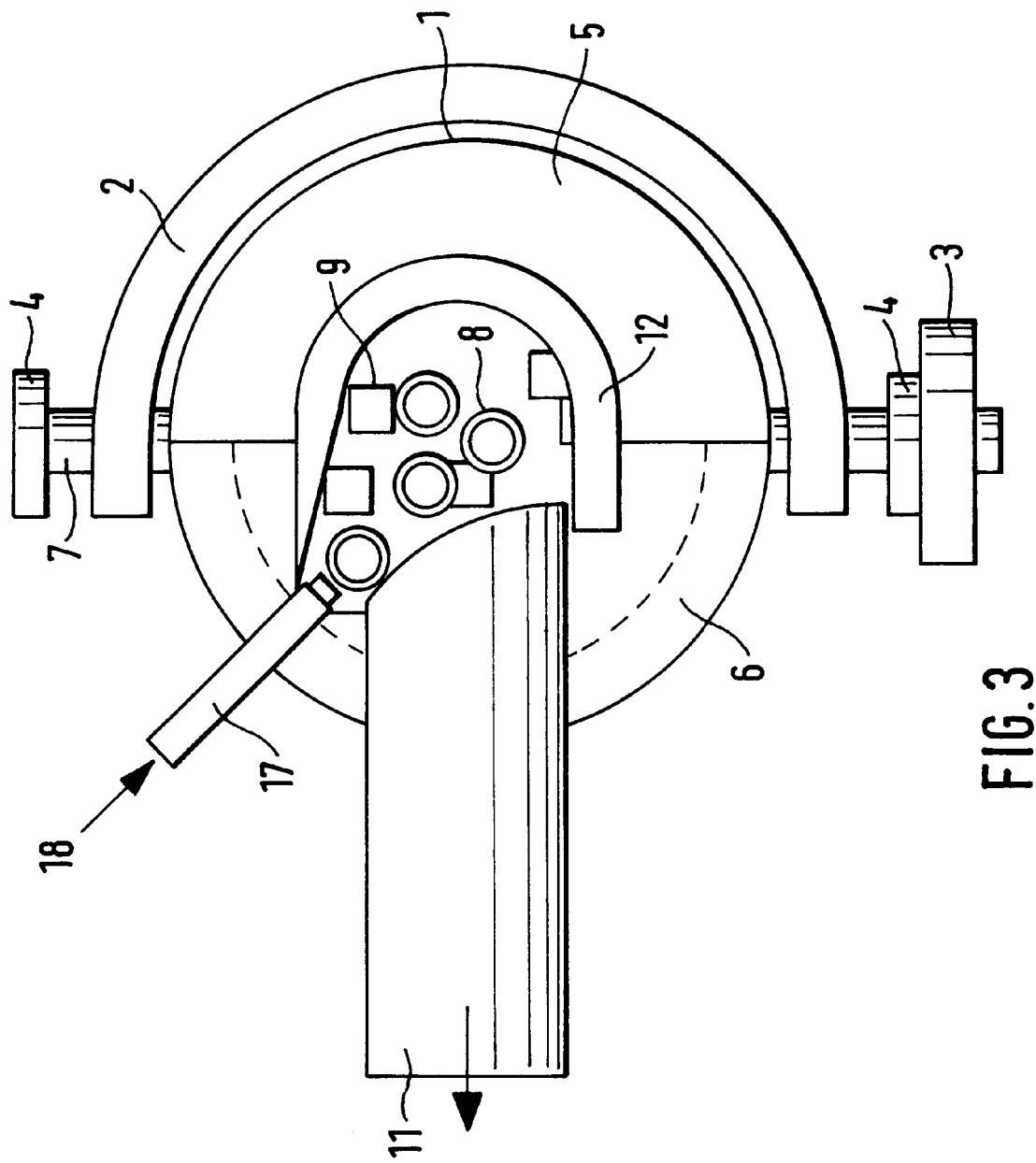
FIG. 3 is a top view of the melting crucible according to the present invention.

FIG. 3 is a top view of the melting crucible 1 which is supported in a semicircular support ring 2 and can be turned by a unilateral drive 3 on roller bearings 4.

The crucible 1 is divided into a curved or bulged crucible portion 5 and a cylindrical crucible portion 6, wherein for structural and symmetrical reasons, the transition is located in the area of the axis of rotation 7.

Bottom nozzles 9 are arranged in the bottom 10 of the crucible 1. The electrodes 8 are lowered into the crucible 1 through the upper part 12 of the crucible 1. The flue gases are removed through a suction hood 11 and are supplied to a dust removal plant, not shown.

Figure 4:
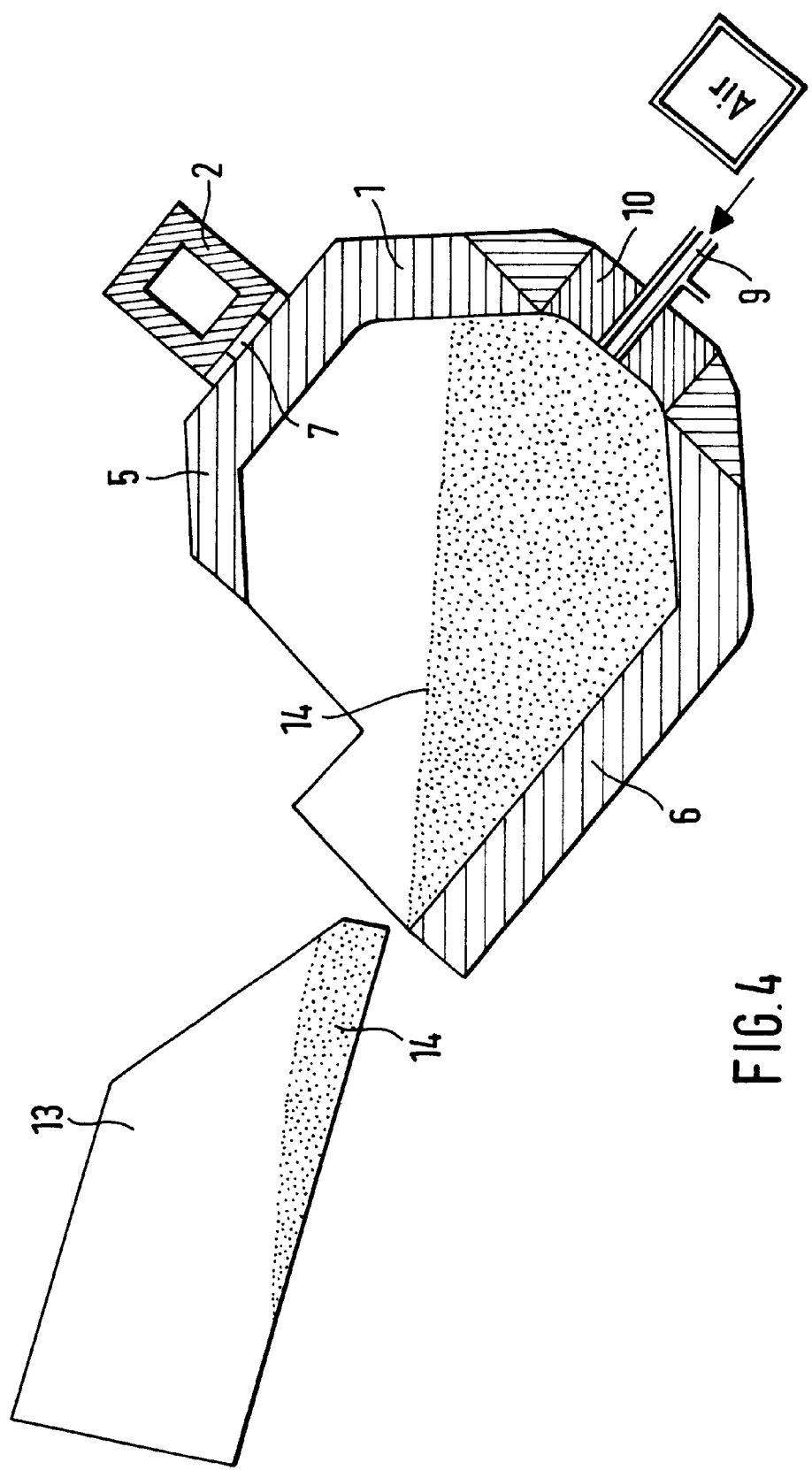
FIG. 4 is a side view of the melting crucible shown in the charging position.

FIG. 4 is a side view of the converter crucible 1 mounted in the support ring 2 shown in the charging position, wherein solid metal charge materials 14 are charged by means of a charging box 13 at the cylindrical crucible portion 6 into the converter crucible 1. During the charging process, air or nitrogen are injected through the bottom nozzles 9 arranged in the bottom 10.

Figure 5:
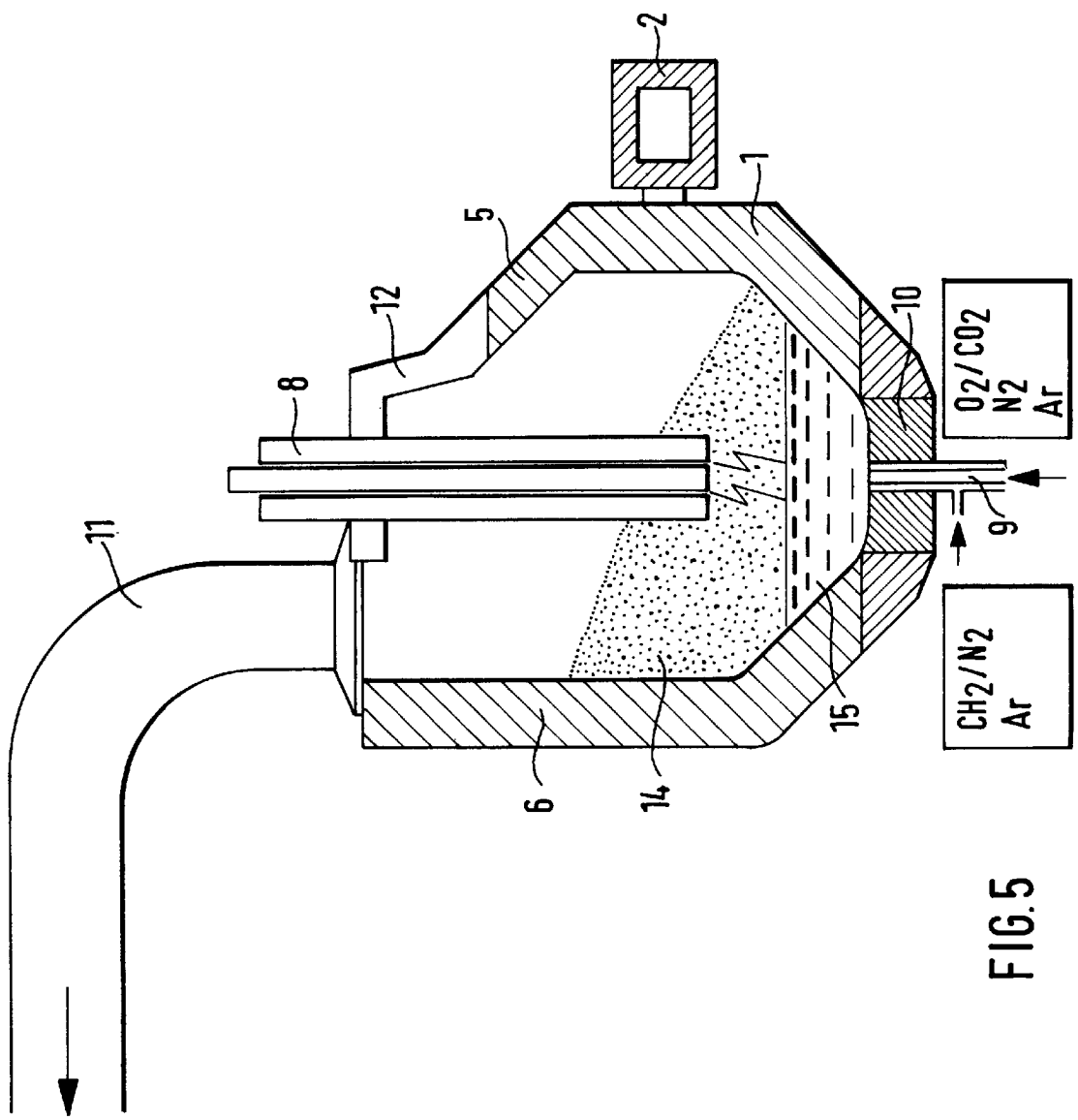
FIG. 5 is a side view of the melting crucible shown in the melting position.

FIG. 5 is a side view of the melting crucible 1 mounted on the support ring 2 and provided with a curved middle part 5 and a cylindrical crucible part 6 shown in the melting position, wherein the electrodes 8 are lowered through the upper part 12 of the melting crucible 1 into the melting crucible 1 up to the solid charge 14. Above the converter bottom 10 in which the bottom nozzles 9 are arranged, a portion of liquid metal or melt 15 has already accumulated.

In accordance with the process sequence shown in FIGS. 1 and 2, cooling gases, i.e., $CH_2/N_2$, are introduced though the outer parts of the nozzles 9 and process gases, i.e., $O_2/CO_2$, $N_2$, Ar are introduced through the inner parts of the nozzles 9. The flue gases are removed through the suction hood 11.

Figure 6:
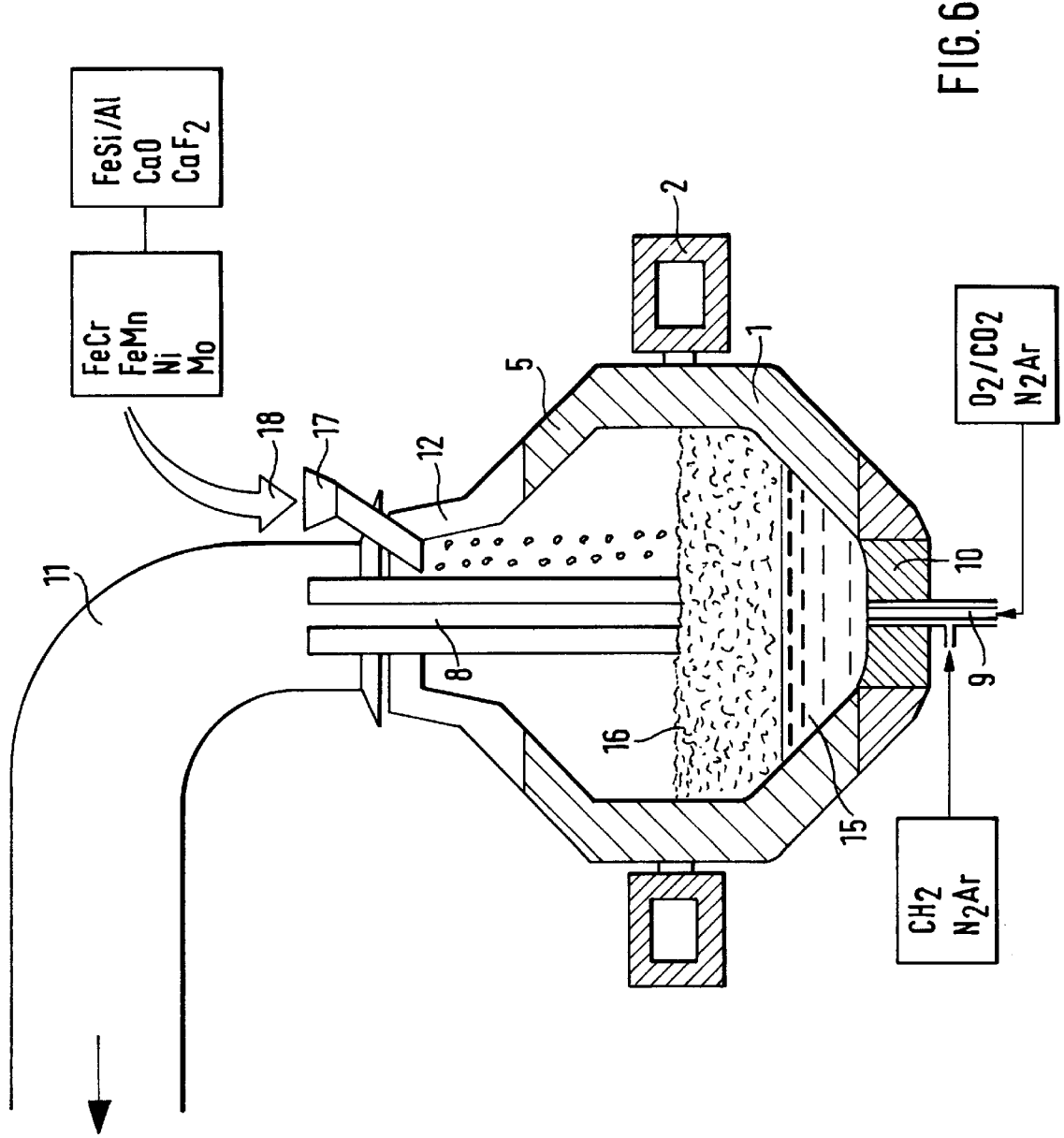
FIG. 6 is a side view of the melting crucible shown in the fining period.

FIG. 6 shows the melting crucible 1 supported in the support ring 2 in the fining phase toward the end of the process sequence. The solid charge materials have been melted, and a mixture of slag 16 and melt 15 has been formed.

In this phase, alloying substances and additives 18 are added through a feed opening 17, and the treatment of the melt now takes place to a reduced extent by the electrical energy through the electrodes 8 as well as through the reaction gases $O_2/CO_2$, $N_2$, Ar supplied through the bottom nozzles 9 arranged in the bottom 10.

While specific embodiments of the invention have been shown and described in detail to illustrate the inventive principles, it will be understood that the invention may be embodied otherwise without departing from such principles.

We claim:

1. An apparatus for carrying out a method of producing steels with predominantly high Cr content, wherein a metal charge is melted in a melting crucible, the charge is alloyed, refined and reduced, and wherein process gases are simultaneously injected, the apparatus comprising a semicircular support ring, a melting crucible mounted so as to be rotatable in the support ring and pivotable about a pivot axis, the melting crucible comprising an exchangeable bottom, the bottom having injection nozzles, the melting crucible further having a pivotable top part, the melting crucible having a cylindrical upper and middle crucible portion on a side facing away from the support ring and having a curved crucible portion tapering in an upward direction and being surrounded by the support ring, wherein a transition between the cylindrical portion and the curved portion is located in an area of the pivot axis.

2. The apparatus according to claim 1, wherein the pivotable top part has openings, further comprising electrodes mounted so as to be movable into the melting crucible through the openings of the top part.

3. The apparatus according to claim 1, wherein the pivotable top part has an additional opening, further comprising a suction hood for flue gases mounted on the additional opening.

4. The apparatus according to claim 1, wherein the bottom nozzles in the bottom are annular gap nozzles.

5. The apparatus according to claim 1, wherein the bottom nozzles in the bottom are casing nozzles.

6. The apparatus according to claim 1, further comprising a tapping connection in an upper portion of the curved crucible portion.

* * * * *